United States Patent [19]

Ludwig

[11] 4,266,788

[45] May 12, 1981

[54] CIRCUMFERENTIAL SHAFT SEAL

[75] Inventor: Lawrence P. Ludwig, Fairview Park, Ohio

[73] Assignee: The United States of America as represented by the Administrator, National Aeronautics and Space Administration, Washington, D.C.

[21] Appl. No.: 102,004

[22] Filed: Dec. 7, 1979

Related U.S. Application Data

[62] Division of Ser. No. 672,219, Mar. 21, 1976, Pat. No. 4,212,477.

[51] Int. Cl.³ .............................................. F16J 15/32
[52] U.S. Cl. ..................................... 277/193; 277/153
[58] Field of Search ................. 277/DIG. 7, DIG. 8, 277/152, 153, 154, 136, 143, 192, 193, 123, 124

[56] References Cited

U.S. PATENT DOCUMENTS

| | | | |
|---|---|---|---|
| 1,200,641 | 10/1916 | Muchnic | 277/193 |
| 1,339,297 | 5/1920 | Spicer | 277/136 |
| 2,368,380 | 1/1945 | Ruzicka | 277/224 |
| 2,983,125 | 5/1961 | Peickii et al. | 277/153 |
| 3,711,104 | 1/1973 | Henry | 277/193 |
| 3,854,732 | 12/1974 | Franz | 277/153 |
| 4,212,477 | 7/1980 | Ludwig | 277/193 |

*Primary Examiner*—Robert I. Smith
*Attorney, Agent, or Firm*—N. T. Musial; J. R. Manning; G. E. Shook

[57] ABSTRACT

A circumferential shaft seal comprising two sealing rings held to a rotating shaft by means of a surrounding elastomeric band. The rings are segmented and are of a rigid sealing material such as carbon or a polyimide and graphite fiber composite.

4 Claims, 4 Drawing Figures

CIRCUMFERENTIAL SHAFT SEAL

ORIGIN OF THE INVENTION

The invention described herein was made by an employee of the U.S. Government and may be manufactured and used by or for the Government for governmental purposes without the payment of any royalties thereon or therefor.

STATEMENT OF COPENDENCY

This invention is a division of application Ser. No. 672,219 which was filed Mar. 21, 1976, and now U.S. Pat. No. 4,212,477.

BACKGROUND OF THE INVENTION

1. Field of the Invention

The present invention relates generally to fluid seals and more particularly to circumferential shaft seals.

2. Description of the Prior Art

Fluid seals incorporating one or more sealing rings to provide a collar sealably enclosing a rotating shaft journaled in a housing are well known. One problem associated with the design of such seals is that expensive machinery and lapping are required to effectively seal off the leakage paths through the seals. Another disadvantage of prior art designs is the inability of the seal rings in the seals to respond adequately to shaft runout so that the useful shaft speed is severely limited.

BRIEF SUMMARY OF THE INVENTION

It is therefore one object of the present invention to provide an improved circumferential shaft seal.

It is another object of the present invention to provide an improved circumferential shaft seal in which seal cost is reduced by elimination of machining tolerances.

It is yet another object to provide an improved circumferential shaft seal in which the sealing elements are capable of adequate response to shaft motion.

The objects of the present invention are achieved by a circumferential shaft seal for sealing a shaft which is rotatably journaled in a housing. The seal comprises an elastomeric band, a plurality of sealing ring segments, and means for sealably engaging the elastomeric band with the housing. The elastomeric band is adapted to encircle the shaft and is spaced therefrom, and is further adapted for sealable engagement with the housing. The sealing ring segments are adapted to be immovably fitted in the space between the elastomeric band and the shaft, and have an inner diameter dimensioned so that the sealing ring segments can slidably and sealably engage the shaft. The plurality of sealing ring segments include a first and second juxtaposed group of segments and the junctions between segments in the first group are displaced relative to the junctions between segments in the second group so that leakage paths are blocked.

The foregoing as well as other objects, features and advantages of the present invention will become more apparent from the following detailed description taken in conjunction with the appended drawing.

DESCRIPTION OF THE PREFERRED EMBODIMENTS

Figure 1:
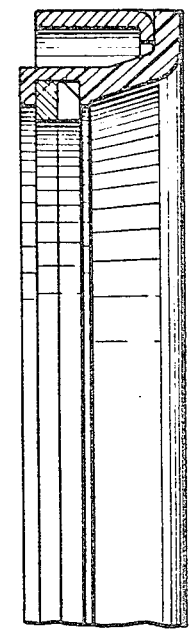
FIG. 1 shows the first embodiment of the circumferential shaft seal in section.
Figure 2:
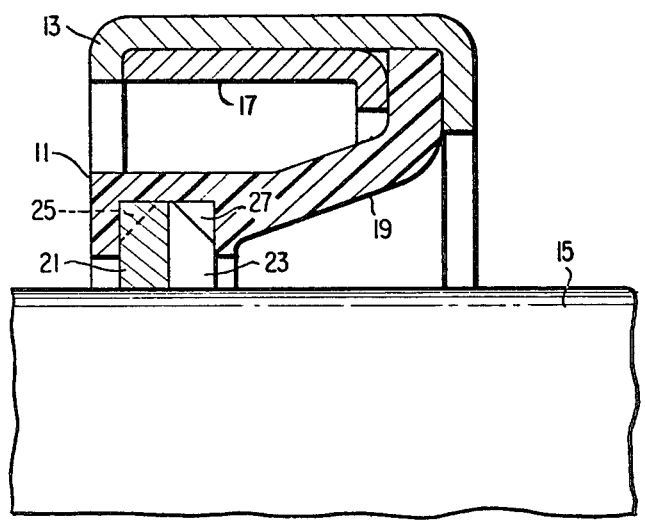
FIG. 2 is an enlarged section of one half of the seal shown in FIG. 1 in position between a housing and a shaft.

Referring now to the drawing wherein like reference numerals designate identical or corresponding parts, there is shown in FIG. 1 at 11 a first embodiment of the circumferential shaft seal. A portion of the seal is shown in enlarged form in FIG. 2 where the seal is disposed in a cavity within a stationary housing 13 and slidably and sealably engaged with a shaft 15 which is rotatably journaled in the housing. The seal 11 includes a resilient cup 17, preferably of metal, mounted in the housing 13, the base of the cup sealably pressing the elastomeric band 19 into engagement with a seat in the housing. The elastomeric band can also be bonded directly to the housing. The elastomeric band is spaced from the surface of the shaft and encircles it. The space is taken up by two juxtaposed sealing rings 21 and 23 movably fitted therein and having an inner diameter dimensioned so that the sealing rings slidably and sealingly engage the shaft 15. The sealing rings are divided into a plurality of segments 25, the junctions between segments in one ring being displaced relative to the junctions between segments in the other ring so that lekage paths are blocked. One end of each segment 25 is stepped so as to define a space between adjacent segments, and lugs of the type shown at 27 project from the elastomeric band 19 into the spaces between adjacent segments. In this manner, the sealing rings are prevented from rotating relative to the band. The lugs also act to hold the rings in place for assembly. The elastomeric band 19 serves as a sealing and a loading device. If wear occurs in the portion of the band adjacent to sealing rings, the band stretches and acts to maintain contact between the sealing rings and the shaft. Garter springs fastened around the outside of the elastomeric band can also be used to exert a radial force that acts to maintain contact between the sealing rings and the shaft.

Figure 3:
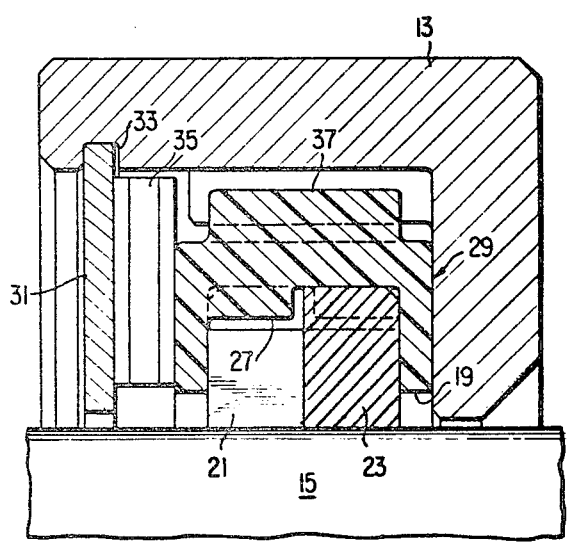
FIG. 3 is a view similar to FIG. 2 showing the second embodiment of the circumferential shaft seal.

FIG. 3 shows a second embodiment of the seal at 29. This seal includes a locking ring 31 mounted in a slot 33 in the housing 13 and encircling the shaft 15. Clearance is provided between the shaft and the locking ring. A wave spring 35 is disposed between the locking ring 31 and the elastomeric band 19 for sealably pressing the band into engagement with a seat in the housing. In order to eliminate relative rotation between the seal 29 and the housing 13, the band 19 can include driving lugs of the type shown at 37 around the outer periphery thereof which fit into slots in the stationary housing and lock the band in place.

Figure 4:
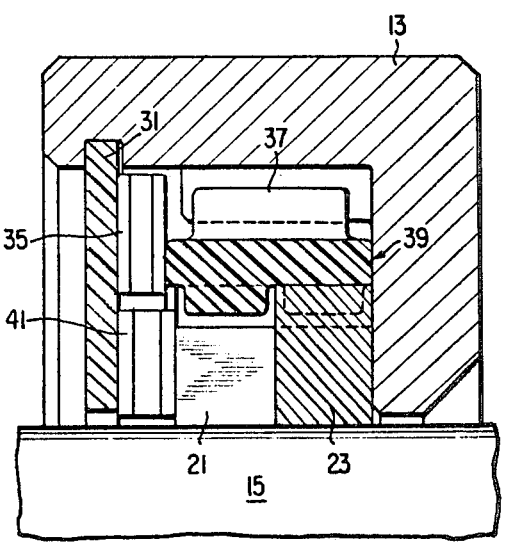
FIG. 4 is a view similar to FIG. 2 showing the third embodiment of the circumferential shaft seal.

FIG. 4 shows a third embodiment of the seal at 39. This seal differs from that shown in FIG. 3 by the inclusion of a second wave spring 41 disposed between the locking ring 31 and the sealing rings 21 and 23 which sealably presses the sealing rings into engagement with the seat in the housing.

The sealing rings are preferably formed from carbon or a polyimide and graphite fiber composite. These materials are tough and wear-resistant and have excellent bearing properties with low coefficients of friction.

Obviously numerous additional modifications and variations of the present invention are possible in light of the above teachings. It is, therefore, to be understood that within the scope of the appended claims the invention may be practiced otherwise than is specifically described herein.

What is claimed is:

1. In a circumferential seal for sealing a shaft rotatably journaled in a housing having at least one slot therein extending substantially parallel to said shaft, the improvement comprising
   an elastomeric band spaced from the shaft and adapted to encircle the shaft, said band having at least one lug projecting from the outer surface thereof extending into said slot in said housing to prevent rotation of said elastomeric band relative to said housing and at least another lug projecting from the inner surface of said band facing said shaft,
   a pair of sealing rings in substantial juxtaposition mounted in the space between the elastomeric band and the shaft, each of said sealing rings having an inner diameter dimensioned so that the sealing rings slidably and sealingly engage the shaft;
   each of said rings consisting essentially of a plurality of segments in simultaneous engagement with both said elastomeric band and said shaft, the junctions between segments in one of said sealing rings being displaced relative to the junctions between segments in the other of said sealing rings, said other lug on the inner surface of said elastomeric band extending into the space between two adjacent segments to prevent rotation of the sealing ring segments relative to said elastomeric band,
   each of said segments having an outer peripheral surface in engagement with said elastomeric band and an inner peripheral surface in engagement with said shaft so that said elastomeric band maintains said sealing ring in engagement with said shaft
   a locking ring adapted to be mounted in the housing and to encircle the shaft in spaced relationship to said elastomeric band and said sealing rings; and
   first resilient means disposed in the space between the locking ring and the elastomeric band for sealably pressing the elastomeric band into sealing engagement with the housing.

2. A circumferential seal as claimed in claim 1 wherein the first resilient means comprises a spring having one face in engagement with said locking ring and an opposite face in engagement with said elastomeric band.

3. A circumferential seal as claimed in claim 1 including second resilient means disposed adjacent to said first resilient means between the locking ring and the plurality of sealing ring segments for sealably pressing the sealing ring segments into seating engagement with the housing.

4. A circumferential seal as claimed in claim 3 wherein the second resilient means comprises a spring having a first face in engagement with said locking ring and a second face in engagement with the segments of one of said sealing rings.

* * * * *